Aug. 31, 1937.  E. H. LEWIS  2,091,824

ELECTRIC CORD SET

Filed May 26, 1933

Inventor:
Edward H. Lewis,
by Harry E. Dunham
His Attorney.

Patented Aug. 31, 1937

2,091,824

UNITED STATES PATENT OFFICE 2,091,824

ELECTRIC CORD SET

Edward H. Lewis, Bridgeport, Conn., assignor to General Electric Company, a corporation of New York Application May 26, 1933, Serial No. 673,068

1 Claim. (Cl. 173—324)

My invention relates to an electric cord set and more particularly to a cord set adapted for connecting a lighting unit to the power supply lines.

In connecting a street lighting unit to the power supply lines it has been customary practice to use a cable consisting of conductors with an individual rubber insulation and an overall rubber covering in order to protect the conductors from atmospheric conditions, especially the effects of moisture, and to provide adequate insulation for the voltages encountered. Difficulty has been experienced due to the fact that at the point of connection of the cable to the lighting unit the temperature is relatively high when current is being supplied to the lighting unit. This high temperature causes the burning of the rubber insulation from the conductors and finally results in a failure of the cable.

The object of my invention is to provide an improved cord set which will withstand the effects of atmospheric conditions and in addition is protected against the effect of heat at the point of connection of the cable to the lighting unit.

What I consider to be novel and my invention will be better understood by reference to the following specification and appended claim when considered in connection with the accompanying drawing.

Figure 1:
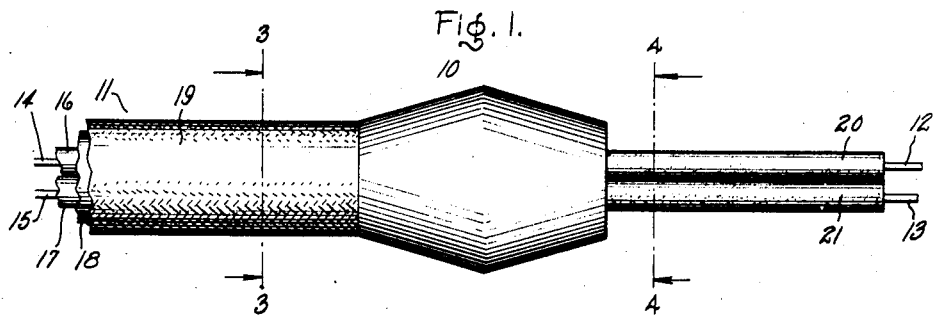
Figure 2:
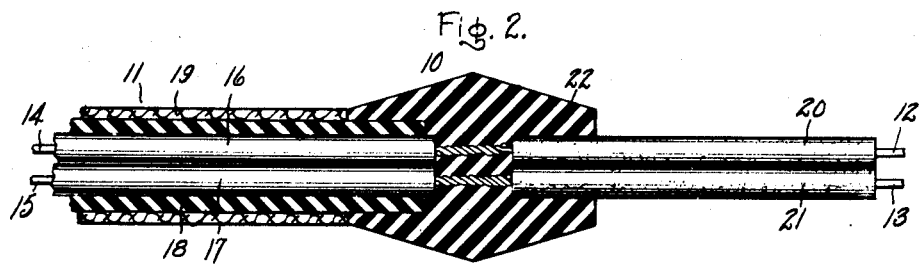
Figure 3:
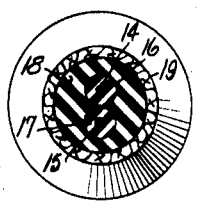
Figure 4:
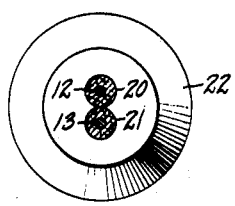
Figure 5:
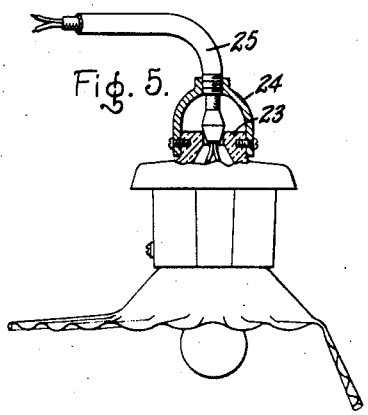

In the accompanying drawing, Fig. 1 is a plan view of my improved cord set; Fig. 2 is a longitudinal sectional view; Fig. 3 is a sectional view on line 3—3 of Fig. 1; Fig. 4 is a sectional view on line 4—4 of Fig. 1, and Fig. 5 is a view partly in section of my cord set connected to a lighting unit.

Referring to the drawing, the cord set is indicated generally by the numeral 10. It comprises a weatherproof cable 11 which is adapted to bring the power supply from the power lines and two conductors 12 and 13 which are connected to the cable at the end which is adapted to be connected to the lighting unit. Weatherproof cable 11 comprises two conductors 14 and 15 which are provided with individual covers of rubber insulation 16 and 17 respectively and an overall thick walled rubber jacket 18. The insulation 16 and 17 is sufficient to provide a protection for the conductors for the relatively low voltage drop generally encountered in series connected lighting units. The overall jacket 18 has a relatively greater thickness to provide adequate protection for the maximum voltage to which the conductors may be subjected by an open circuit secondary of a transformer. A heavy overall cotton braid 19 is provided and may be impregnated with a flameproof material. Conductors 12 and 13 are provided with coverings 20 and 21 of a heat resistant material, preferably asbestos. Over the joint between conductors 12 and 13 and weatherproof cable 11 a molded rubber plug 22 is provided. Plug 22 is of circular cross section of increasing diameter from the two ends to the center and is provided so that it may be inserted in the opening in the insulator 23, as shown in Fig. 5 so that the cable will be thoroughly protected from the atmospheric conditions and will provide ample insulation up to the point where the asbestos insulation is provided on the conductors which are protected by the insulator 23 through which they pass. Insulator 23 is secured to a metal cap 24 which is supported on the end of pipe 25. If the plug 22 were not provided and forced into the opening of insulator 23 then the conductors 12 and 13 with their asbestos insulation might extend into the metal cap 24 and be located in close proximity to the side walls of the cap. At this point the cable would have a reduced resistance to atmospheric conditions and also the conductors would only be protected for a relatively low voltage. Thus the provision of the plug which is adapted to be inserted in the portion of the insulator 23 insures that the portion of the conductors provided with the asbestos insulation extends only within the porcelain insulator which provides ample insulation for the maximum voltage to which the cable may be subjected and the plug closes the opening and prevents moisture from entering from the top of the insulator. Plug 22 extends over the overall rubber jacket 18 a short distance from the end of the cable to the point at which the overall braid 19 has been removed and likewise extends over the asbestos coverings 20 and 21 of conductors 12 and 13 to a short distance beyond the end of the covering.

If it is desired a rubber insulation may be used over the conductors 12 and 13 with an outer covering of asbestos to provide both the heat resistance and weatherproofing characteristics. However, due to the fact that this portion of the cable or cord set is generally located within the housing of the lighting unit the weatherproofing of the conductors 12 and 13 is not essential.

From the foregoing it will be seen that a cord set is provided for connecting a lighting unit to power supply lines which is unaffected by the high temperature of the lighting unit and in addition is protected against the effects of atmospheric conditions.

What I claim as new and desire to secure by Letters Patent of the United States, is:

5. In combination, a high wattage lighting unit having an opening for the entrance of conductors and an electric cord set comprising a weatherproof cable extending to said lighting unit, a plurality of conductors with heat resisting insulation located within said lighting unit, and a molded rubber plug covering the connection of said conductors to said cable and adapted to close the opening in said lighting unit to prevent the entrance of moisture into said lighting unit and also to prevent passage of moisture over said conductors.

EDWARD H. LEWIS.